April 5, 1927.
C. C. GOODRICH
1,623,240
LUBRICATING SYSTEM
Filed June 23, 1924
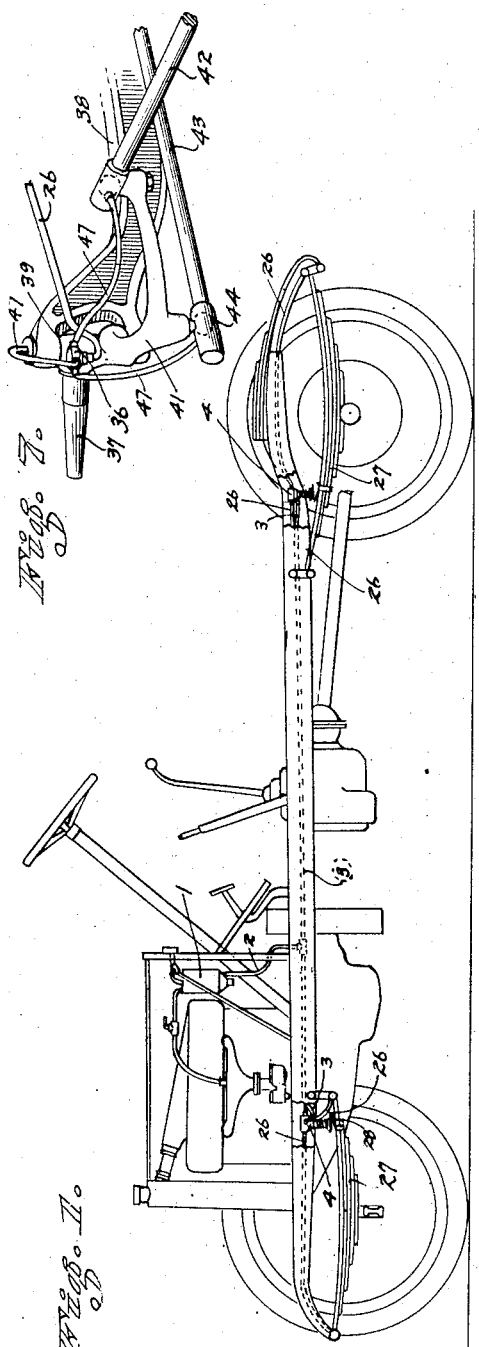
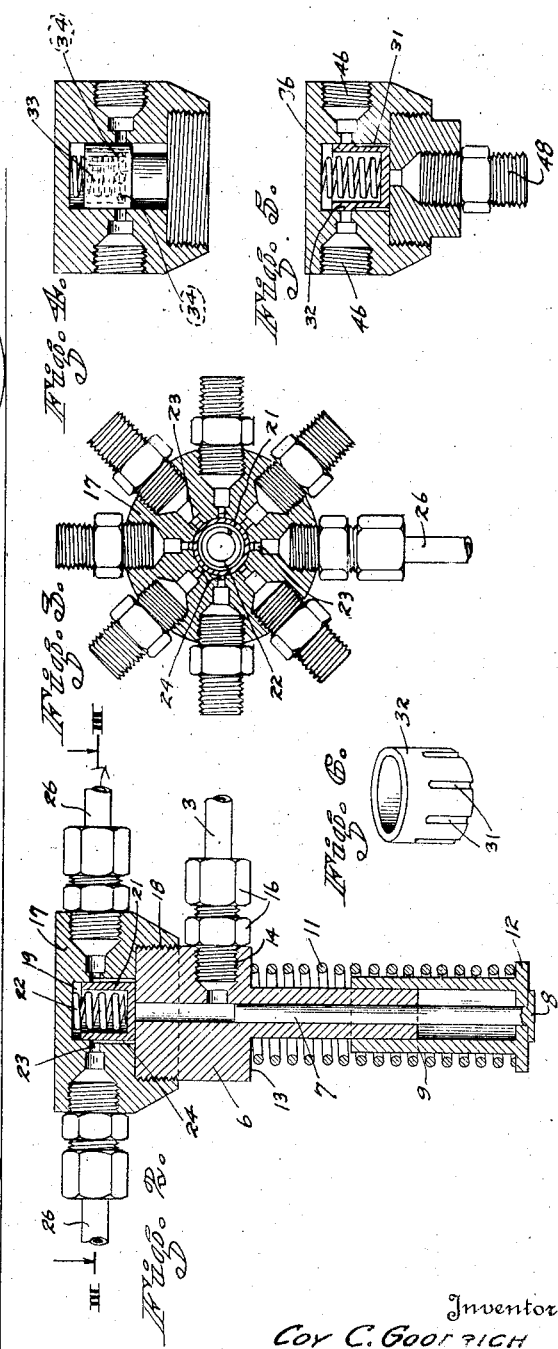
Inventor
Coy C. Goodrich
By
Attorneys Patented Apr. 5, 1927.

1,623,240

UNITED STATES PATENT OFFICE.

COY C. GOODRICH, OF SAN FRANCISCO, CALIFORNIA.

LUBRICATING SYSTEM.

Application filed June 23, 1924. Serial No. 721,887.

The present invention relates to improvements in a lubricating system and has particular reference to a lubricating system adapted to be used in combination with a road vehicle. It is proposed to provide a lubricating system that is in continuous operation while the motor vehicle is traveling and continuously forces a lubricant in minute quantities into the various bearings for shackles, springs, etc. It is further proposed to utilize as an operating means for this distributing system the vibrations of the springs of the vehicle. It is further proposed to provide means allowing the continuously moving lubricant to be distributed in such a manner that each place requiring lubrication receives an amount corresponding to its particular requirements. Further objects and advantages of my invention will appear as the specification proceeds.

The preferred forms of my invention are illustrated in the accompanying drawing, in which Figure 1 shows a side view of a motor vehicle having my system attached thereto, Figure 2 a vertical section through my distributing pump, Figure 3 a horizontal section taken along line III—III of Figure 2, Figures 4 and 5 vertical sections through modified forms of a distributing head, Figure 6 a perspective detail view of a spreader used in the distributing head shown in Figure 5, and Figure 7 a view illustrating the arrangement of a sub-distributing head. While I have shown only the preferred form of the invention, it should be understood that various changes or modifications may be made within the scope of the claims hereto attached without departing from the spirit of the invention.

The tank 1 shown in Figure 1 is assumed to be filled with a proper lubricant and same can be of any suitable well known construction. The tank is preferably supported near the dash of the motor vehicle and has a discharge pipe 2 leading to the general supply pipe 3 for the pumps 4, two of which are shown in Figure 1, but any plurality of which may be used in accordance with the requirements and exigencies of each particular case.

One of the distributing pumps is illustrated in Figures 2 and 3 and comprises a cylinder 6 having a plunger or piston 7 reciprocable therein, the extreme end 8 of the piston being fixed to a cap 9 slidable on the outside of the cylinder and normally forced outwardly by means of a coiled spring 11 bearing on the flange 12 of the cap 9 and on a shoulder 13 formed in the cylinder. A port 14 is provided in the side of the cylinder and communicates through suitable couplings 16 with the general supply pipe 3, which latter, being normally filled with lubricant from the tank 1, delivers a charge into the cylinder whenever the piston 7 recedes to its outermost position. A casting 17 threaded on the piston as shown at 18 is provided with a recess 19 communicating with the discharge end of the cylinder and the recess accommodates the cup 21 yieldingly forced against the discharge end of the cylinder by means of the spring 22. The cup 21 is used as a spreader for the lubricant forced from the discharge end of the cylinder. A plurality of radial ports 23 in the distributing head communicate through individual grooves 24 with the space over which the lubricant spreads so that the latter is forced into the grooves and from there into the ports 23, which latter communicate with pipes or tubes serving as leads to the various bearings to which a lubricant is to be applied.

The pump is preferably operated by the vibration of the main springs 27 of the vehicle. The pump is secured to the frame by means of a suitable bracket and short auxiliary springs 28 are preferably interposed between the cup 9 and the main spring 27 to prevent the main spring from acting on the piston 7 too violently.

The grooves 24 leading the lubricant into the pipes 26 may be made of varying sizes so as to allow the proper amount of lubricant to be forced therethrough for the particular bearing the pipe is connected to. Other means of properly distributing the lubricant in accordance with the requirements of the different places of application are shown in Figures 4 and 5, Figure 5 differing from the form of Figure 2 by the fact that the grooves 31 are disposed within the cup 32 instead of in the wall of the recess, and Figure 4 differing by the arrangement of the cup 33 in such a manner that when lifted it clears the ports 34 arranged radially in the distributing head so that the lubricant may flow into these ports directly. In the latter case the ports may be made of different diameter, whereby the quantity of lubricant discharged therethrough is controlled.

The advantages of my invention will be readily understood from the foregoing description. My system utilizes the vibrations of the springs for doing useful work. It furthermore insures an even and continuous lubrication of all the parts requiring lubrication. The arrangement of a piston or plunger of comparatively small cross-section bearing on a comparatively small quantity of lubricant insures proper lubrication at all times, since the force exercised by the vehicle springs will be sufficiently strong to overcome any tendency in any one of the pipes to become clogged up. The lubricant is applied to its point of application under pressure and is certain to penetrate any bearing that under the old method of applying grease in grease cups or even under pressure at long intervals may resist any attempt of forcing grease therethrough.

Where a number of places requiring lubrication are grouped together, it is advisable to provide a sub-distributing head 36 such as shown in Figure 5 rather than to lead individual pipes from the main distributing head to each individual grease cup. This sub-distributing head does not require any power of its own for operating the same since the pressure created by the main distributing head is sufficient to force the lubricant against the cup over the resistance of the spring and the cup again acts in the same manner as the cup in the main distributing head. The lubricant thus forced into the sub-distributing head is distributed into the various tubes leading to the various points of application in the same manner as if the latter were connected directly with the main distributing head. The sub-distributing head may be made of any suitable shape to fit into the mechanical arrangement of its surroundings and may be provided with any suitable number of outlet pipes in accordance with the requirements of each particular situation.

One case of applying the sub-distributing head is illustrated in Figure 7 in which the same is shown in connection with the steering knuckle arrangement of a motor vehicle. The spindle 37 for the front wheel is pivoted to the front axle 38 as shown at 39 and is operated through the yoke 41 by means of the steering rod 42. A tie rod 43 universally connected to the yoke as at 44 establishes connection with a corresponding element on the spindle of the second wheel (not shown). The sub-distributing head 36 is fastened to the knuckle arrangement in any suitable manner. One of the threaded outlets 46 may, for instance, be screwed on a correspondingly threaded grease cup for the spindle bearing, while the other outlets are connected, by means of various tubes or pipes 47, to other points requiring lubrication in the manner illustrated in Figure 7. The intake 48 of the sub-distributing head is connected in any suitable manner to any one of the distributing pipes 26 emanating from the main distributing head.

I claim:

1. A distributing head for a pumping system comprising a casting recessed to communicate with the discharge port of the pumping system, a spring pressed cup slidable in the recess and normally closing said port and positioned to intercept and to close the cylinder so as to force the lubricant to spread, longitudinal grooves along the wall of the recess allowing the spreading lubricant to be forced thereinto and transverse ports communicating with the grooves having passages communicating therewith for guiding the lubricant to its various points of application.

2. In a lubricating mechanism of the class described, a circular series of discharge connections, a member axially positioned with respect to all of said connections and terminating at one end in a valve seat, said member having an axial bore and a radial bore, the latter opening to the former, the radial bore adapted to open to a source of lubricant supply, a plunger operating in said axial bore and across said radial bore and normally disposed below the latter in spaced relation to the valve seat so that a well for the reception of a charge of lubricant is provided in the axial bore above the plunger, a valve movable with respect to said seat and said connections and normally closing the upper end of the axial bore, means influencing the valve to urge same against the seat, the said valve having grooves correlated to the respective connections so that when the valve is lifted from the seat, the lubricant in the well will be forced in an upward direction on one movement of the plunger to thereby lift the valve from the seat and cause the lubricant in the well to flow therefrom past the valve, thence through the respective grooves of the latter and to the respective discharge connections, and means for reciprocating said plunger to permit the parts to function as aforesaid.

COY C. GOODRICH.